United States Patent
Zhao et al.

(10) Patent No.: US 11,747,695 B2
(45) Date of Patent: Sep. 5, 2023

(54) MULTICOLOR ELECTROCHROMIC STRUCTURE, FABRICATION METHOD AND APPLICATION THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Zhigang Zhao, Suzhou (CN); Zhen Wang, Suzhou (CN); Shan Cong, Suzhou (CN)

(73) Assignee: SUZHOU INSTITUTE OF NANO-TECH AND NANO-BIONICS, Suzhou (CN)

( * ) Notice: Subject to any disclaimer, the term of this patent is extended or adjusted under 35 U.S.C. 154(b) by 369 days.

(21) Appl. No.: 16/762,671

(22) PCT Filed: Mar. 6, 2019

(86) PCT No.: PCT/CN2019/077096
§ 371 (c)(1),
(2) Date: May 8, 2020

(87) PCT Pub. No.: WO2020/172901
PCT Pub. Date: Mar. 9, 2020

(65) Prior Publication Data
US 2021/0215988 A1    Jul. 15, 2021

(30) Foreign Application Priority Data
Feb. 27, 2019    (CN) .......................... 201910146293.7

(51) Int. Cl.
G02F 1/153    (2006.01)
G02F 1/157    (2006.01)
(Continued)

(52) U.S. Cl.
CPC ........ G02F 1/157 (2013.01); G02F 1/133354 (2021.01); G02F 1/155 (2013.01);
(Continued)

(58) Field of Classification Search
CPC .. G02F 1/157; G02F 1/1524; G02F 1/133354; G02F 1/155; G02F 1/1533; G02F 2203/34
(Continued)

(56) References Cited

U.S. PATENT DOCUMENTS

| 11,225,045 B2* | 1/2022 | Kim | B32B 17/06 |
| 2007/0206263 A1* | 9/2007 | Neuman | G02F 1/153 |
| | | | 359/267 |
| 2013/0128333 A1* | 5/2013 | Agrawal | B60R 1/12 |
| | | | 359/267 |

FOREIGN PATENT DOCUMENTS

EP    0818706 A2 *    1/1998

* cited by examiner

*Primary Examiner* — Mahidere S Sahle

(57) ABSTRACT

A multicolor electrochromic structure comprises a working electrode, an electrolyte and an auxiliary electrode. The electrolyte is distributed between the working electrode and the auxiliary electrode. The working electrode comprises an electrochromic layer which comprises a first reflective surface and a second reflective surface arranged face to face in parallel. A dielectric layer is arranged between the first and the second reflective surfaces. The first and the second reflective surfaces and the dielectric layer form an optical cavity. The dielectric layer is fabricated by an electrochromic material. The multicolor electrochromic structure can combine a structural color with electrochromism to display various color changes; it features a simple structure, low costs and a wide application prospect, and it is easy to be fabricated. Also provided are a fabrication method and a regulation method of the multicolor electrochromic struc-
(Continued)

ture, and an electrochromic device, an image display, comprising the multicolor electrochromic structure.

20 Claims, 5 Drawing Sheets

(51) Int. Cl.
*G02F 1/1524* (2019.01)
*G02F 1/1333* (2006.01)
*G02F 1/155* (2006.01)
(52) U.S. Cl.
CPC .......... *G02F 1/1524* (2019.01); *G02F 1/1533* (2013.01); *G02F 2203/34* (2013.01)
(58) Field of Classification Search
USPC ................................................ 359/267, 273
See application file for complete search history.

MULTICOLOR ELECTROCHROMIC STRUCTURE, FABRICATION METHOD AND APPLICATION THEREOF

TECHNICAL FIELD

The present invention relates to an electrochromic device, specifically to a multicolor electrochromic structure, a fabrication method and application thereof, and belongs to the field of photoelectric technologies.

BACKGROUND

Electrochromism is the phenomenon where the electronic structure and optical properties (such as reflectance, transmittance, absorption and the like) of an electrochromic material stably and reversibly change under the action of an external electric field or current, and shows reversible color and transmittance changes in appearance. An electrochromic device fabricated by an electrochromic material is widely applied to a smart window, a display, an imaging device and the like. The traditional electrochromic device can be classified a transmittance mode and a reflection mode. However, the color of the electrochromic device is only decided by its electronic structure and optical properties. Compared with an organic-molecule or organic-polymer electrochromic material, an inorganic electrochromic material shows excellent cycling stability, great thermal stability, chemical stability and longer service life, but its color regulation still is very monotonous. It can be specifically explained as follows: (1) the inorganic electrochromic material has a very monotonous electrochromic state, for example, most of the inorganic electrochromic materials can only be converted between a transparent state and a blue state; (2) the inorganic electrochromic material is lack of fine regulation of color, for example, blue as one of the three primary colors can be divided into sky blue, water blue, sea blue, peacock blue, navy blue and the like based on different hues. However, the traditional electrochromic material such as the tungsten oxide material can only change the degree of brightness of blue, but not the hue of the blue.

Therefore, multicolor regulation of the inorganic electrochromic material always is the bottleneck of expanding application of inorganic electrochromic displays and imaging devices.

SUMMARY

To overcome deficiencies of the prior art, a main objective of the present invention mainly is to provide a multicolor electrochromic structure, a fabrication method and application thereof.

To achieve the above objective, the present invention adopts the following technical solutions:

An embodiment of the present invention provides a multicolor electrochromic structure, which comprises a working electrode, an electrolyte and an auxiliary electrode. The electrolyte is distributed between the working electrode and the auxiliary electrode. The working electrode comprises an electrochromic layer. The electrochromic layer comprises a first reflective surface and a second reflective surface, which are arranged face to face in parallel. A dielectric layer is arranged between the first reflective surface and a second reflective surface. The first reflective surface, the second reflective surface and the dielectric layer form an optical cavity. When incident light falls in the optical cavity, a phase shift of a reflected light formed on the first reflective surface and a reflected light formed on the second reflective surface is $\tilde{\beta}=(2\pi/\lambda)\tilde{n}_1 d \cos \tilde{\theta}_1$. $d$ is a thickness of the dielectric layer; $\tilde{n}_1$ is a refractive index of the dielectric layer; $\lambda$ is a wavelength of the incident light; $\tilde{\theta}_1$ is an angle of refraction when the incident light passes through the first reflective surface.

In some embodiments, the first reflective surface is a first surface of the dielectric layer, the second reflective surface is a combined interface of a second surface of the dielectric layer and a metal layer, and the first surface and the second surface are arranged back to back.

In some embodiments, the electrochromic layer comprises a metal reflective layer and at least one dielectric layer, and the dielectric layer is mainly fabricated by an electrochromic material, especially an inorganic electrochromic material.

In some preferred embodiments, the metal reflective layer is further a current collector of the electrochromic layer.

The embodiment of the present invention further provides a fabrication method of the multicolor electrochromic structure, which comprises:

fabricating a metal reflective layer and a dielectric layer to form a working electrode; and assembling the working electrode, an electrolyte, an auxiliary electrode to form a multicolor electrochromic structure.

The embodiment of the present invention further provides a regulation method of the multicolor electrochromic structure, which comprises:

connecting the working electrode and the auxiliary electrode with a power supply to form a working circuit;

regulating the difference in potential between the working electrode and the auxiliary electrode such that the refractive index of an electrochromic material in the dielectric layer is changed so as to regulate the color of the multicolor electrochromic structure.

The embodiment of the present invention further provides application of the multicolor electrochromic structure, such as fabricating an electrochromic device and an image display.

Compared with the prior art, the embodiment of the present invention can obtain various structural colors by regulating the material of the metal reflective layer, the material of the dielectric layer and/or the thickness of the dielectric layer in the electrochromic layer. Furthermore, voltage is applied to the electrochromic layer such that ions are implanted into or released from the electrochromic material, thereby causing changes of the refractive index of the electrochromic material and optical parameters of the dielectric layer, and finally causing color change of the electrochromic layer. The multicolor electrochromic structure has various color changes by combination of the structural color and the electrochromism, simple fabrication technique, low costs and wide application prospect in the field of photoelectric technologies, and is suitable for scale production and application.

DESCRIPTION OF THE EMBODIMENTS

Figure 1:
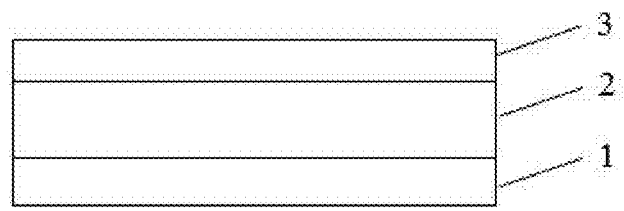
FIG. 1 is a schematic diagram of a multicolor electrochromic structure in a typical embodiment of the present invention.

In order to illustrate the embodiments of the present invention or the technical solutions in the prior art more clearly, the drawings required for use in the description of the embodiment or the prior art will be simply introduced below; obviously, the drawings described below are merely some of the embodiments recorded in the present invention, and for a person ordinarily skilled in the art, other drawings may be also obtained according to these drawings without involving any inventive effort.

It should be noted that the use of relational terms herein, such as first and second and the like, are used solely to distinguish one entity or action from another without necessarily requiring or implying any actual relationship or order between such entities or actions. Furthermore, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Where no other restrictions are stated, the elements defined by the phrase "comprising a" do not exclude the presence of additional identical elements in a process, method, article, or apparatus that includes said elements.

In one aspect, an embodiment of the present invention provides a multicolor electrochromic structure, which comprises a working electrode, an electrolyte and an auxiliary electrode. The electrolyte is distributed between the working electrode and the auxiliary electrode. The working electrode comprises an electrochromic layer. The electrochromic layer comprises a first reflective surface and a second reflective surface, which are arranged face to face in parallel. A dielectric layer is arranged between the first reflective surface and a second reflective surface. The first reflective surface, the second reflective surface and the dielectric layer form an optical cavity. When incident light falls in the optical cavity, a phase shift of a reflected light formed on the first reflective surface and a reflected light formed on the second reflective surface is $\tilde{\beta}=(2\pi/\lambda)\tilde{n}_1 d \cos\tilde{\theta}_1$. d is a thickness of the dielectric layer; $\tilde{n}_1$ is a refractive index of the dielectric layer; $\lambda$ is a wavelength of the incident light; $\tilde{\theta}_1$ is an angle of refraction when the incident light passes through the first reflective surface.

Further, the first reflective surface is a first surface of the dielectric layer, the second reflective surface is a combined interface of a second surface of the dielectric layer and a metal layer, and the first surface and the second surface are arranged back to back.

Further, when the multicolor electrochromic structure is working, the reflected light formed by the incident light on the first surface (namely the first reflective surface) of the dielectric layer and the reflected light formed by the incident light passing through the dielectric layer on a surface (namely the second reflective surface) of the metal layer are in interference superposition.

Further, if a refractive index of a medium on the first surface of the dielectric layer is defined as $\tilde{n}_0$, a reflection coefficient of the first reflective surface is $\tilde{r}_{01}=(\tilde{n}_0 \cos\tilde{\theta}_0-\tilde{n}_1 \cos\tilde{\theta}_1)/(\tilde{n}_0 \cos\tilde{\theta}_0+\tilde{n}_1 \cos\tilde{\theta}_1)$, wherein $\tilde{\theta}_0$ is an angle of incidence of the incident light.

Further, if a refractive index of a medium on the second surface of the dielectric layer is defined as $\tilde{n}_2$, a reflection coefficient of the second reflective surface is $\tilde{r}_{12}=(\tilde{n}_1 \cos\tilde{\theta}_1-\tilde{n}_2 \cos\tilde{\theta}_2)/(\tilde{n}_1 \cos\tilde{\theta}_1+\tilde{n}_2 \cos\tilde{\theta}_2)$, wherein $\tilde{\theta}_2$ is an angle of refraction when the incident light passes through the second reflective surface.

Further, a reflection coefficient of the electrochromic layer is $$\tilde{r} = \frac{\tilde{r}_{01} + \tilde{r}_{12}e^{2i\tilde{\beta}}}{1 + \tilde{r}_{01}\tilde{r}_{12}e^{2i\tilde{\beta}}},$$

and its reflectance is $$R = |\tilde{r}|^2 = \frac{\tilde{r}_{01}^2 + \tilde{r}_{12}^2 + 2\tilde{r}_{01}\tilde{r}_{12}\cos 2\tilde{\beta}}{1 + \tilde{r}_{01}^2\tilde{r}_{12}^2 + 2\tilde{r}_{01}\tilde{r}_{12}\cos 2\tilde{\beta}}.$$

Further, the electrochromic layer comprises a metal reflective layer and at least one dielectric layer, and the dielectric layer is mainly fabricated by an electrochromic material.

FIG. 1 shows a multicolor electrochromic structure in a typical embodiment of the present invention. The multicolor electrochromic structure comprises a working electrode 1, an auxiliary electrode 3 and an electrolyte layer 2. The electrolyte layer 2 is arranged between the working electrode 1 and the auxiliary electrode 3.

Wherein the electrolyte layer 2 may be a proper aqueous electrolyte, an organic electrolyte or a gel electrolyte, such as LiCl, ACl$_3$, HCl, aqueous solution of H$_2$SO$_4$, a propylene carbonate electrolyte of LiClO$_4$, etc., but is not limited thereto.

Figure 2:
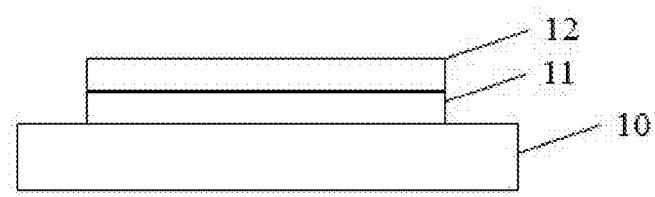
FIG. 2 is a schematic structural diagram of an electrochromic layer in FIG. 1.

As shown in FIG. 2, the working electrode 1 comprises an electrochromic layer. The electrochromic layer comprises a metal reflective layer 11 and a dielectric layer 12. The dielectric layer 12 is fabricated by an electrochromic material.

Wherein, as described above, the structural color of the electrochromic layer can be changed by regulating the material of the metal reflective layer, the material of the dielectric layer, the thickness of the dielectric layer and the like. Furthermore, the color of the dielectric layer can change by regulating the voltage, the current, etc. applied to an electrochromic material.

Wherein the electrochromic material may be an inorganic electrochromic material or an organic electrochromic material, preferably the inorganic electrochromic material.

The inorganic electrochromic material suitable for the embodiment of the present invention may comprise transition metal oxides, such as WO$_3$, NiO, TiO$_2$, Nb$_2$O$_5$, Fe$_2$O$_3$, Co$_2$O$_3$, MoO$_3$, etc., but is not limited thereto, such as Prussian blue etc.

Wherein the dielectric layer can be optimized by further adding a thin metal layer or a semiconductor layer. The metal layer comprises Ag, Al, Cu, Ni, etc., but is not limited thereto; the semiconductor layer may be Al$_2$O$_3$, SiO$_2$, ZnS, MgF$_2$, SiN$_x$, etc., but is not limited thereto.

In some embodiments, the dielectric layer is in contact with the electrolyte.

In some embodiments, the thickness of the dielectric layer preferably is in the range of 50-2000 nm such that the color saturation of the multicolor electrochromic structure is higher.

In some embodiments, the thickness of the metal reflective layer may be any values, preferably more than 20 nm, more preferably in the range of 50-3000 nm.

In some embodiments, the material of the metal reflective layer may be an inactive metal such as gold, silver, copper, tungsten, titanium, or alloys thereof, etc., but is not limited thereto.

In some preferred embodiments, the metal reflective layer is further utilized as a current collector of the electrochromic layer.

In some embodiments, the auxiliary electrode comprises a transparent conducting electrode with an ion storage layer, and the material of the auxiliary electrode may be NiO, Fe$_2$O$_3$, TiO$_2$, etc., but is not limited thereto. The ion storage layer is in contact with the electrolyte.

In some embodiments, referring to FIG. 2, the working electrode may further comprise a substrate 10, and the electrochromic layer is arranged on the substrate.

The material of the substrate may be inorganic or organic, such as glass, organic glass, a plastic plate, a wood plate, metal, etc., but is not limited thereto.

In some embodiments, the electrolyte comprises a liquid electrolyte, a gel electrolyte or a solid electrolyte.

In some specific embodiments, the working voltage of the multicolor electrochromic structure is from −4 V to +4 V, but is not limited thereto.

In another aspect, an embodiment of the present invention provides a fabrication method of the multicolor electrochromic structure, which comprises:

fabricating a metal reflective layer and a dielectric layer to form a working electrode; and assembling the working electrode, an electrolyte, an auxiliary electrode to form a multicolor electrochromic structure.

In some embodiments, the metal reflective layer and the dielectric layer can be fabricated in at least one manner of magnetron sputtering, electron beam evaporation, thermal evaporation and electrochemical deposition.

More specifically, the dielectric layer can be fabricated in a manner of magnetron sputtering, electron beam evaporation, thermal evaporation, electrochemical deposition, etc.

More specifically, the metal reflective layer can be fabricated in a manner of magnetron sputtering, electron beam evaporation, thermal evaporation, etc.

In some embodiments, an electrolyte layer can be formed by encapsulating a liquid electrolyte or closely pressing a gel electrolyte, and is arranged between the working electrode and the auxiliary electrode.

Further, the metal reflective layer and the dielectric layer can be sequentially formed on a substrate.

In another aspect, an embodiment of the present invention provides a regulation method of a multicolor electrochromic structure, which comprises:

connecting a working electrode and an auxiliary electrode with a power supply to form a working circuit;

regulating the difference in potential between the working electrode and the auxiliary electrode such that the refractive index of an electrochromic material in a dielectric layer is changed so as to regulate the color of the multicolor electrochromic structure. Such regulating process may be dynamic.

In some embodiments, the color of the multicolor electrochromic structure may also be regulated by regulating the material of a metal reflective layer and/or the thickness and/or the material of the dielectric layer.

In another aspect, an embodiment of the present invention provides an electrochromic device comprising the multicolor electrochromic structure. The electrochromic device may further comprise an additional encapsulation structure, a control module, a power supply module, which may be combined with the multicolor electrochromic structure in a common manner.

In another aspect, an embodiment of the present invention provides an image display device comprising the multicolor electrochromic structure or the electrochromic device, wherein the image display device may be a display screen, an imaging device, etc., but is not limited thereto.

In another aspect, an embodiment of the present invention provides an apparatus comprising the multicolor electrochromic structure, the electrochromic device or the image display device, wherein the apparatus may be a door, a window, or an external wall of a house, a vehicle, etc., and may also be an outdoor billboard, etc., but is not limited thereto.

The multicolor electrochromic structure provided by the embodiment of the present invention can overcome a disadvantage that the color of the traditional inorganic electrochromic device is monotonous, combines various structural colors with the electrochromism to enrich colors of the electrochromic device and also achieves dynamic regulation of multicolor. Wherein the electrochromic layer mainly comprises the metal reflective layer and the dielectric layer, and the dielectric layer is fabricated by the electrochromic material. The electrochromic layer can obtain various structural colors by regulating the material of the metal layer, the material of the dielectric layer, the thickness of the dielectric layer, etc. Furthermore, the electrochromic layer is utilized as the working electrode, and voltage is applied to the working electrode such that ions in the electrolyte layer are implanted into or released from the electrochromic material, thereby causing changes of the refractive index of the electrochromic material and optical parameters of the dielectric layer, and finally causing color change. The multicolor electrochromic structure in the embodiment of the present invention can achieve various color changes of the electrochromic material, especially an inorganic electrochromic material, by utilizing combination of the structural color and the electrochromism. Additionally, in the multicolor electrochromic structure provided by the embodiment of the present invention, the metal reflective layer can further be utilized as the current collector of the electrochromic layer so as to further simplify the multicolor electrochromic structure, reduce the costs and make the device thinner and more compact.

The following further describes the technical solution of the present invention in detail with reference to several embodiments and the accompanying drawings. However, the preferred embodiments merely are for illustrative purposes and do not limit the scope of the present invention.

Embodiment 1

A multicolor electrochromic device disclosed in Embodiment 1 comprises a working electrode, an electrolyte layer and an auxiliary electrode. The electrolyte layer is arranged between the working electrode and the auxiliary electrode.

Figure 3:
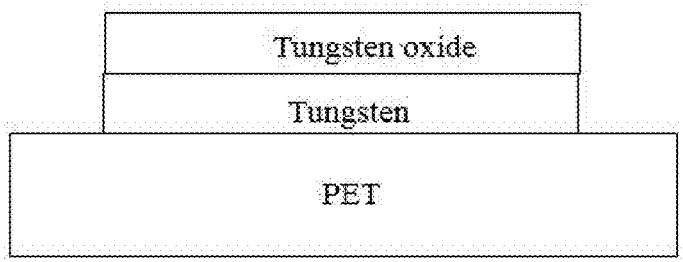
FIG. 3 is a schematic structural diagram of an electrochromic layer in a multicolor electrochromic device in Embodiment 1 of the present invention.

As shown in FIG. 3, the working electrode comprises an electrochromic layer arranged on a substrate, and the electrochromic layer comprises a metal reflective layer and a dielectric layer, wherein the metal reflective layer is fabricated by tungsten and the dielectric layer is fabricated by tungsten oxide. The substrate may be a PET plastic plate.

A fabrication method of the working electrode comprises: first, fabricating a tungsten film on a clean PET plastic plate in a manner of magnetron sputtering, wherein a thickness of the tungsten film is preferably 300 nm; second, fabricating a tungsten oxide layer on the tungsten film in a manner of magnetron sputtering, wherein a thickness of the tungsten oxide layer is preferably in the range of 150-400 nm.

Certainly, the tungsten film can also be fabricated in a manner of electron beam evaporation, thermal evaporation and the like as known in the art. The tungsten oxide layer can also be fabricated in a manner of electron beam evaporation, thermal evaporation, electrochemical deposition and the like as known in the art.

Figure 4:
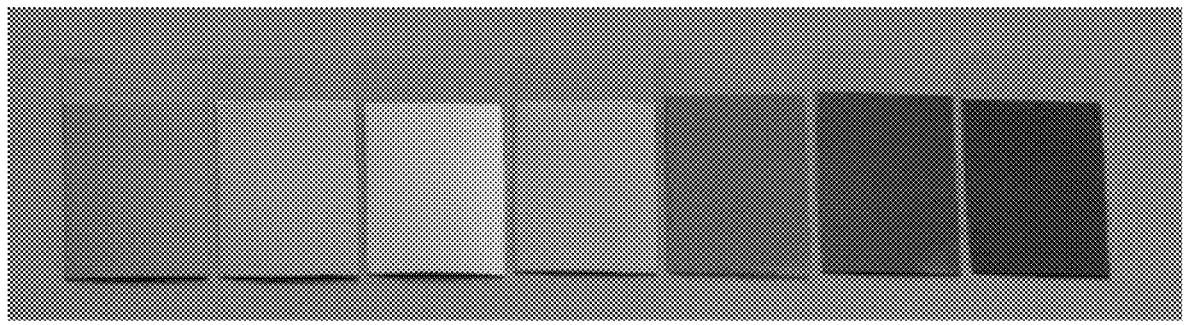
FIG. 4 shows pictures of an electrochromic electrode in a multicolor electrochromic device when the thickness of a tungsten oxide layer is different in Embodiment 1 of the present invention.

As shown in FIG. 4, different colors of the electrochromic layers can be obtained like a color film according to different thicknesses of the tungsten oxide layers.

The fabricated color film is utilized as the electrochromic layer. An auxiliary electrode layer is fabricated additionally, such as an NiO auxiliary electrode layer. After a LiClO$_4$-PC electrolyte is encapsulated between the working electrode and the auxiliary electrode, a wire is arranged. Therefore, a multicolor electrochromic device fabricated. The color of the obtained multicolor electrochromic device can be further regulated by applying voltages.

Figure 5:
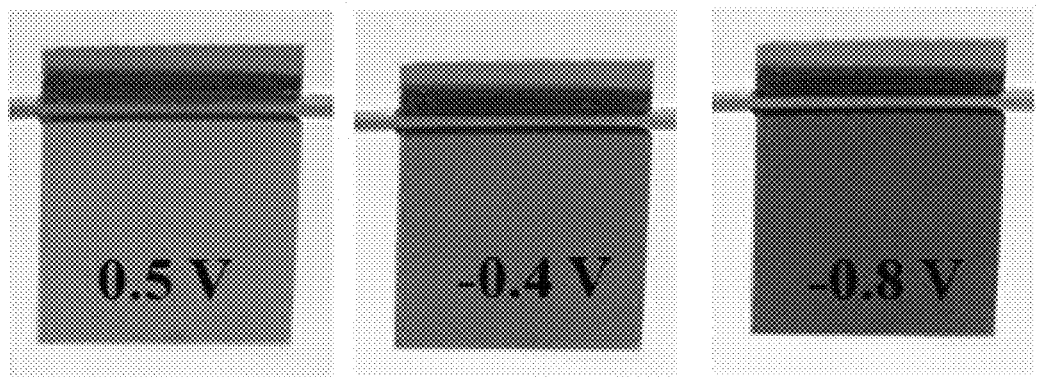
FIG. 5 shows pictures of a working electrode having the original color of pink under different voltages in Embodiment 1 of the present invention.
Figure 6:
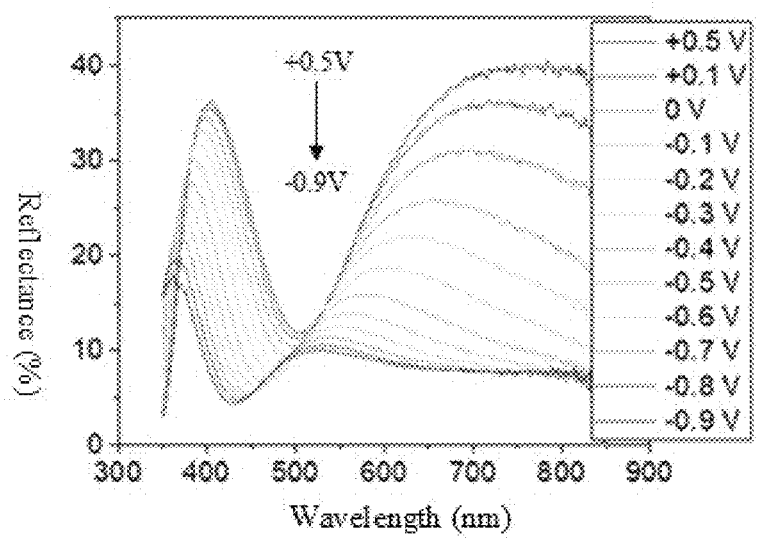
FIG. 6 is a cycling stability test diagram of a working electrode having the original color of pink in Embodiment 1 of the present invention.

FIG. 5 and FIG. 6 respectively show a diagram of regulation of the reflectance of a working electrode, the original color of which is pink, under different voltages of an open system, and pictures of the colors of the working electrodes under three of the voltages in Embodiment 1. The open system selects a Pt filament as the auxiliary electrode and Ag/AgCl as a reference electrode in test. It can be seen that the color of the film can be regulated from red to yellow and then from the yellow to green.

Figure 7:
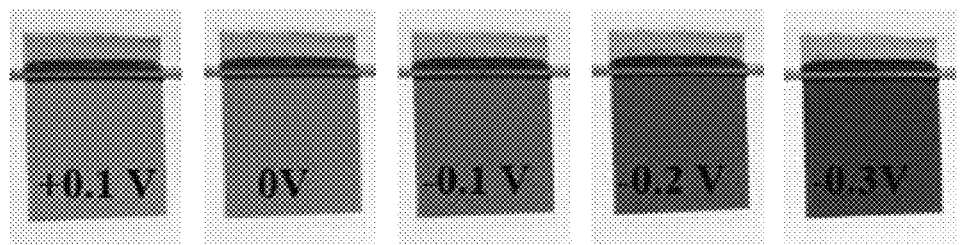
FIG. 7 shows pictures of a working electrode having the original color of blue under different voltages in Embodiment 1 of the present invention.
Figure 8:
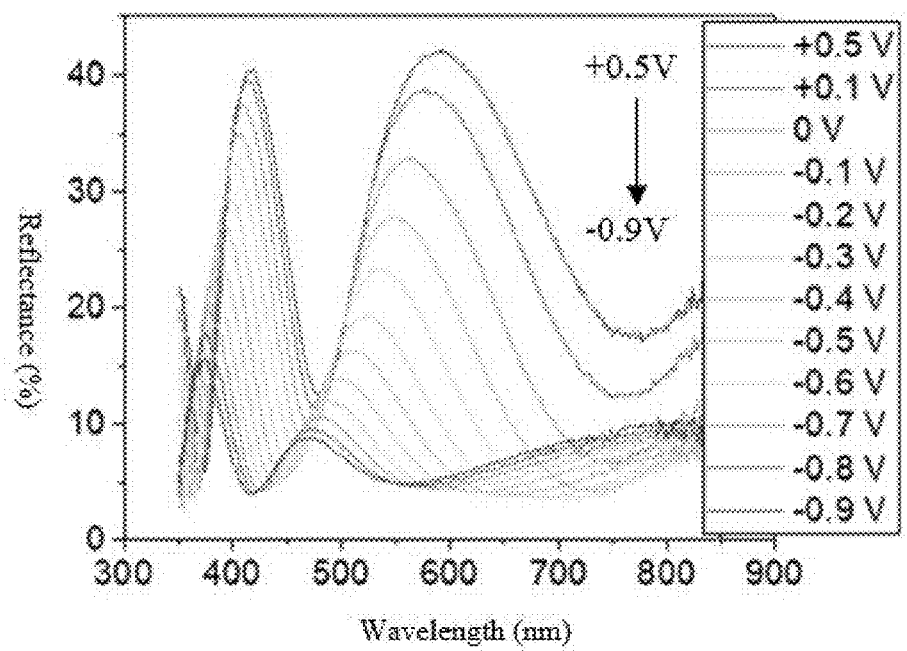
FIG. 8 is a cycling stability test diagram of a working electrode having the original color of blue in Embodiment 1 of the present invention.

FIG. 7 and FIG. 8 respectively show a diagram of regulation of the reflectance of an electrochromic electrode, the original color of which is blue, under different voltages of an open system, and pictures of the colors of the electrochromic electrodes under five of the voltages in Embodiment 1. The open system selects a Pt filament as the auxiliary electrode and Ag/AgCl as a reference electrode in test. It can be seen that the color of the film can be regulated among different blues.

Embodiment 2

A multicolor electrochromic device disclosed in Embodiment 2 comprises a working electrode, an electrolyte layer and an auxiliary electrode. The electrolyte layer is arranged between the working electrode and the auxiliary electrode.

Figure 9:
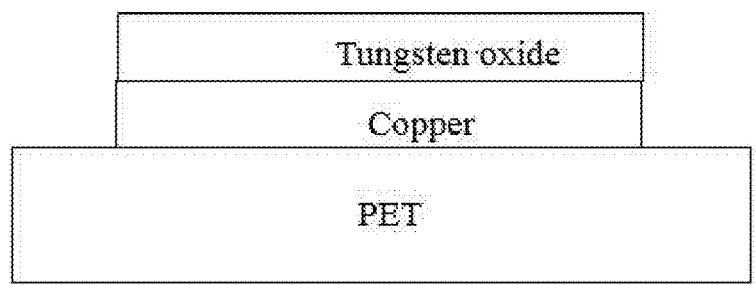
FIG. 9 is a schematic structural diagram of an electrochromic layer in a multicolor electrochromic device in Embodiment 2 of the present invention.

As shown in FIG. 9, the working electrode comprises an electrochromic layer arranged on a substrate, and the electrochromic layer comprises a metal reflective layer and a dielectric layer, wherein the metal reflective layer is fabricated by copper and the dielectric layer is fabricated by tungsten oxide. The substrate may be a PET plastic plate.

A fabrication method of the working electrode comprises: first, fabricating a copper film on a clean PET plastic plate in a manner of magnetron sputtering, wherein a thickness of the copper film is preferably 100 nm; second, fabricating a tungsten oxide layer on the copper film in a manner of magnetron sputtering, wherein a thickness of the tungsten oxide layer is preferably in the range of 150-400 nm.

Certainly, the copper film can also be fabricated in a manner of electron beam evaporation, thermal evaporation and the like as known in the art. The tungsten oxide layer can also be fabricated in a manner of electron beam evaporation, thermal evaporation, electrochemical deposition and the like as known in the art.

Figure 10:
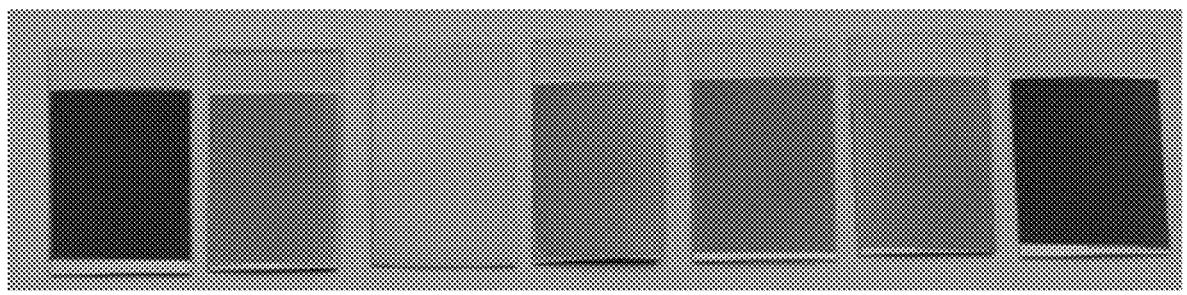
FIG. 10 shows pictures of an electrochromic electrode in a multicolor electrochromic device when the thickness of a tungsten oxide layer is different in Embodiment 2 of the present invention.

As shown in FIG. 10, different colors of the electrochromic layers can be obtained like a color film according to different thicknesses of the tungsten oxide layers.

Embodiment 3

A multicolor electrochromic device disclosed in Embodiment 3 comprises a working electrode, an electrolyte layer and an auxiliary electrode. The electrolyte layer is arranged between the working electrode and the auxiliary electrode.

Figure 11:
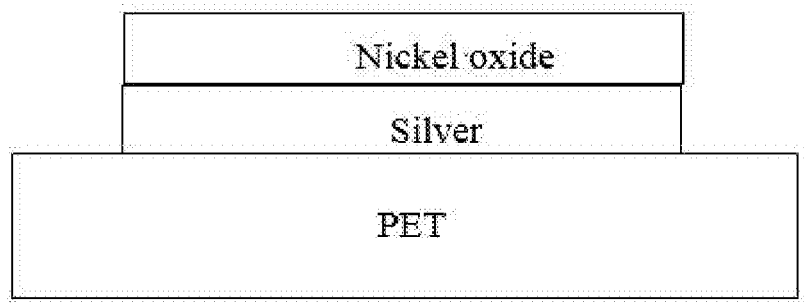
FIG. 11 is a schematic structural diagram of an electrochromic layer in a multicolor electrochromic device in Embodiment 3 of the present invention.

As shown in FIG. 11, the working electrode comprises an electrochromic layer arranged on a substrate, and the electrochromic layer comprises a metal reflective layer and a dielectric layer, wherein the metal reflective layer is fabricated by silver and the dielectric layer is fabricated by nickel oxide. The substrate may be a PET plastic plate.

A fabrication method of the working electrode comprises: first, fabricating a silver film on a clean PET plastic plate in a manner of magnetron sputtering, wherein a thickness of the silver film is preferably 200 nm; second, fabricating a nickel oxide layer on the silver film in a manner of magnetron sputtering, wherein a thickness of the nickel oxide layer is preferably in the range of 50-300 nm.

Certainly, the silver film can also be fabricated in a manner of electron beam evaporation, thermal evaporation and the like as known in the art. The nickel oxide layer can also be fabricated in a manner of electron beam evaporation, thermal evaporation, electrochemical deposition and the like as known in the art.

Figure 12:
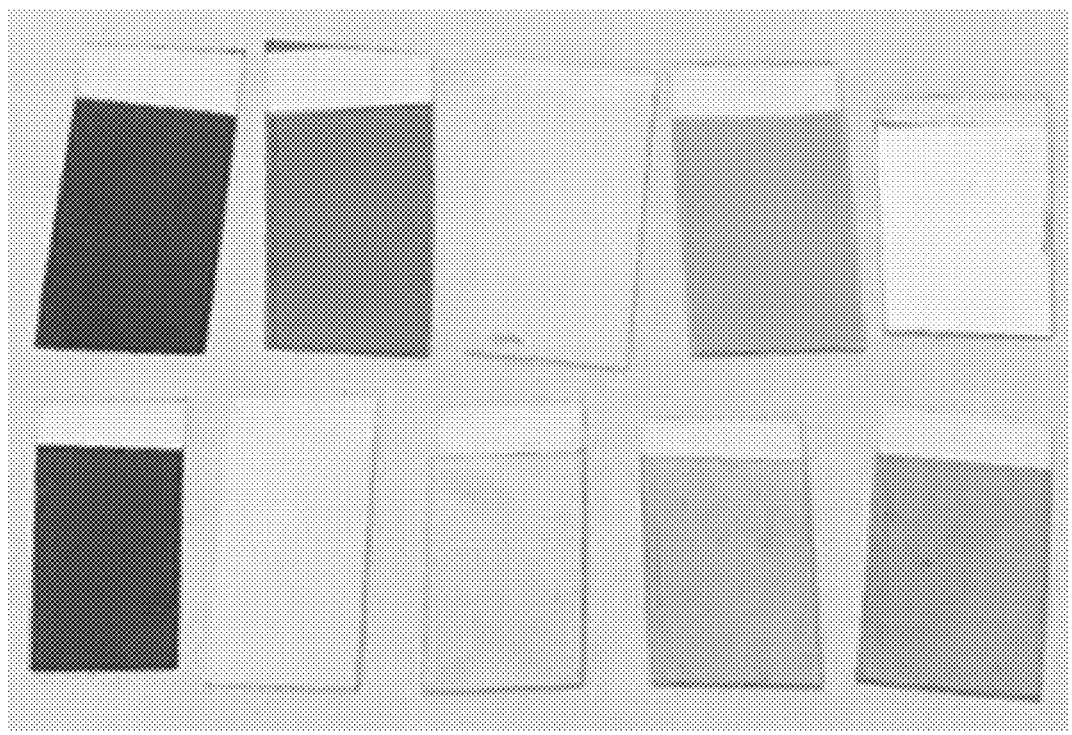
FIG. 12 shows pictures of an electrochromic electrode in a multicolor electrochromic device when the thickness of a nickel oxide layer is different in Embodiment 3 of the present invention.

As shown in FIG. 12, different colors of the electrochromic layers can be obtained like a color film according to different thicknesses of the nickel oxide layers.

Embodiment 4

A multicolor electrochromic device disclosed in Embodiment 4 comprises a working electrode, an electrolyte layer and an auxiliary electrode. The electrolyte layer is arranged between the working electrode and the auxiliary electrode.

Figure 13:
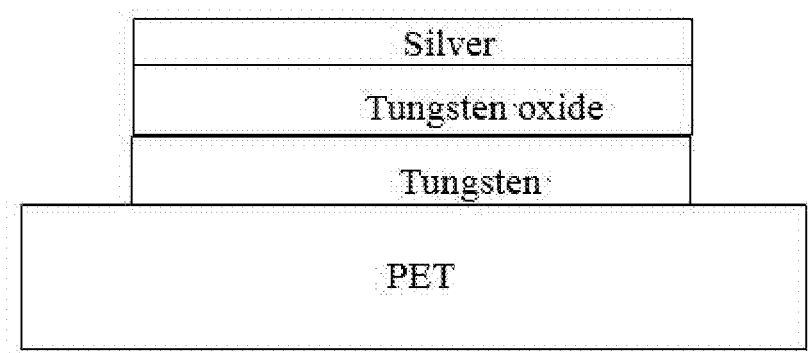
FIG. 13 is a schematic structural diagram of an electrochromic layer in a multicolor electrochromic device in Embodiment 4 of the present invention.

As shown in FIG. 13, the working electrode comprises an electrochromic layer arranged on a substrate, and the electrochromic layer comprises a metal reflective layer, a dielectric layer and an optimized layer, wherein the metal reflective layer is fabricated by tungsten, the dielectric layer is fabricated by tungsten oxide, and the optimized layer is fabricated by silver. The substrate may be a PET plastic plate.

A fabrication method of the working electrode comprises: first, fabricating a tungsten film on a clean PET plastic plate in a manner of magnetron sputtering, wherein a thickness of the tungsten film is preferably 100 nm; second, fabricating a tungsten oxide layer on the tungsten film in a manner of magnetron sputtering, wherein a thickness of the tungsten oxide layer is preferably in the range of 150-400 nm. third, fabricating a silver layer on the tungsten oxide film in a manner of magnetron sputtering, wherein a thickness of the silver layer is preferably in the range of 1-15 nm.

Certainly, the tungsten film can also be fabricated in a manner of electron beam evaporation, thermal evaporation and the like as known in the art. The tungsten oxide layer can also be fabricated in a manner of electron beam evaporation, thermal evaporation, electrochemical deposition and the like as known in the art. The silver layer can be fabricated in a manner of electron beam evaporation, thermal evaporation, electrochemical deposition and the like as known in the art.

Figure 14:
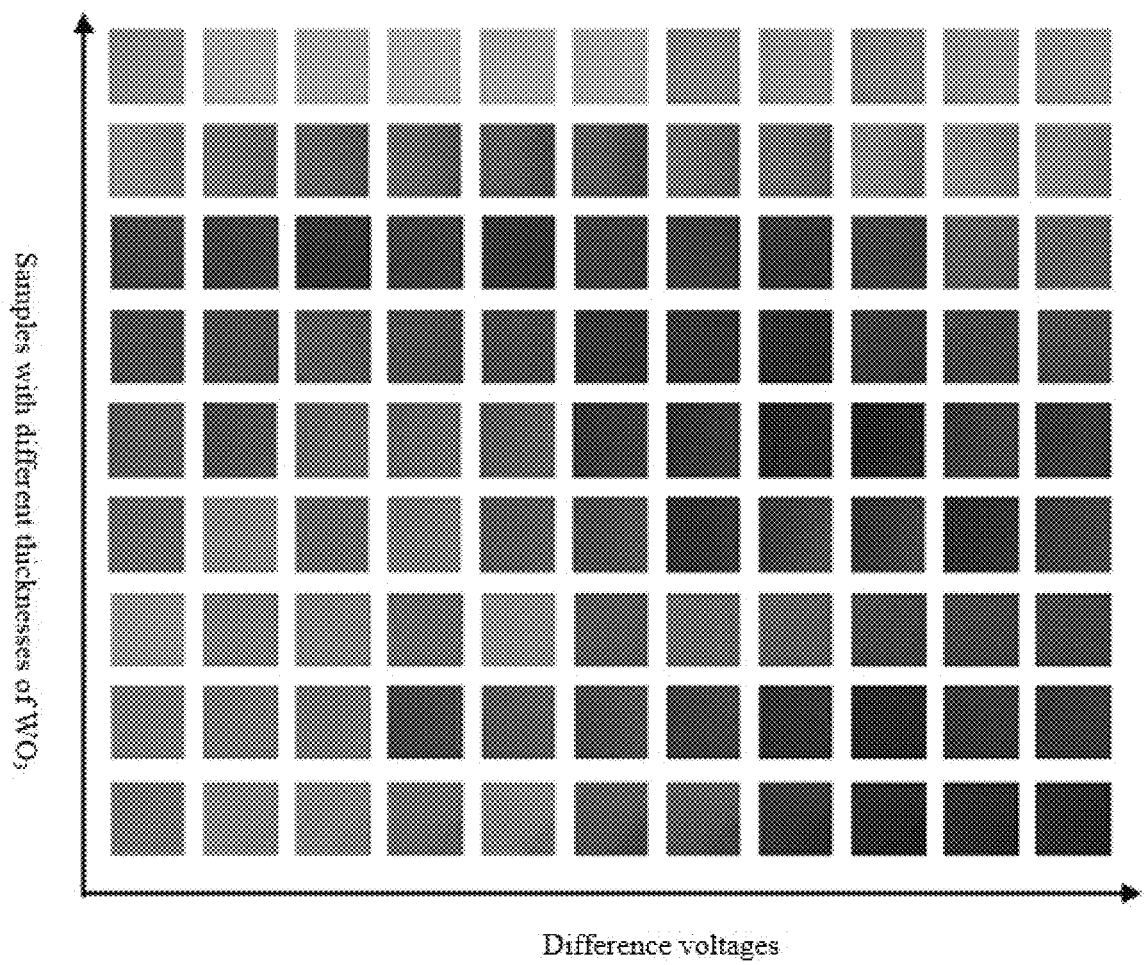
FIG. 14 shows pictures of an electrochromic electrode in a multicolor electrochromic device when the thickness of a tungsten oxide layer is different and a silver optimized layer is arranged in Embodiment 4 of the present invention.

As shown in FIG. 14, the thickness of the silver layer is different such that the color of the film can be further optimized in comparison with Embodiment 1. FIG. 14 shows colors of samples, in which an Ag optimized layer is added and the tungsten oxide layer has different thicknesses, under different voltages.

Furthermore, the applicant of the present invention also conducts experiments by using other electrochromic materials, metal reflective materials, substrate materials and the like listed in the specification to replace the relative materials in the embodiments, then finds out that the obtain multicolor electrochromic structures and devices still have similar advantages.

The multicolor electrochromic structure provided by the embodiments of the present invention can combine the structural color with the electrochromism to display various color changes so as to lay a stable foundation for application of the multicolor electrochromism and have a wide prospect.

It should be understood that the above embodiments merely illustrate technical conceptions and features of the present invention, which aims at enabling persons familiar with this technology to understand and implement the content of the present invention, but not intend to limit the protection scope of the present invention. Equivalent changes or modifications made according to the spiritual substance of the present invention should fall within the protection scope of the present invention.

What is claimed is:

1. A multicolor electrochromic structure, consisting of a working electrode, an electrolyte and an auxiliary electrode, wherein the electrolyte is distributed between the working electrode and the auxiliary electrode; the working electrode consists of an electrochromic layer; the electrochromic layer consists of a first reflective surface, a second reflective surface, a dielectric layer, a metal reflective layer and a thin metal layer; the first reflective surface and the second reflective surface are arranged face to face in parallel; the dielectric layer is arranged between the first reflective surface and the second reflective surface; the first reflective surface, the second reflective surface and the dielectric layer form an optical cavity; when incident light falls in the optical cavity, a phase shift of a reflected light formed on the first reflective surface and a reflected light formed on the second reflective surface is $\tilde{\beta}=(2\pi/\lambda)\tilde{n}_1 d \cos \tilde{\theta}_1$, d is a thickness of the dielectric layer, $\tilde{n}_1$ is a refractive index of the dielectric layer, $\lambda$ is a wavelength of the incident light, $\tilde{\theta}_1$ is an angle of refraction when the incident light passes through the first reflective surface; the metal reflective layer and the thin metal layer are positioned in parallel on opposite sides of the dielectric layer; wherein the material of the metal reflective layer is selected from gold, silver, copper, tungsten and titanium; and the material of the thin metal layer is selected from Ag, Al, Cu and Ni.

2. The multicolor electrochromic structure according to claim 1, wherein the first reflective surface is a first surface of the dielectric layer, the second reflective surface is a combined interface of a second surface of the dielectric layer and the metal reflective layer, and the first surface and the second surface are arranged back to back.

3. The multicolor electrochromic structure according to claim 2, wherein if a refractive index of a medium on the first surface of the dielectric layer is defined as $\tilde{n}_0$, a reflection coefficient of the first reflective surface is $\tilde{r}_{01}=(\tilde{n}_0 \cos \tilde{\theta}_0 - \tilde{n}_1 \cos \tilde{\theta}_1)/(\tilde{n}_0 \cos \tilde{\theta}_0 + \tilde{n}_1 \cos \tilde{\theta}_1)$, and $\tilde{\theta}_0$ is an angle of incidence of the incident light;

and/or, if a refractive index of a medium on the second surface of the dielectric layer is defined as $\tilde{n}_2$, a reflection coefficient of the second reflective surface is $\tilde{r}_{12}=(\tilde{n}_1 \cos \tilde{\theta}_1 - \tilde{n}_2 \cos \tilde{\theta}_2)/(\tilde{n}_1 \cos \tilde{\theta}_1 + \tilde{n}_2 \cos \tilde{\theta}_2)$, and $\tilde{\theta}_2$ is an angle of refraction when the incident light passes through the second reflective surface.

4. The multicolor electrochromic structure according to claim 3, wherein a reflection coefficient of the electrochromic layer is $$\tilde{r} = \frac{\tilde{r}_{01} + \tilde{r}_{12} e^{2i\tilde{\beta}}}{1 + \tilde{r}_{01} \tilde{r}_{12} e^{2i\tilde{\beta}}},$$

and its reflectance is $$R = |\tilde{r}|^2 = \frac{\tilde{r}_{01}^2 + \tilde{r}_{12}^2 + 2\tilde{r}_{01}\tilde{r}_{12}\cos 2\tilde{\beta}}{1 + \tilde{r}_{01}^2 \tilde{r}_{12}^2 + 2\tilde{r}_{01}\tilde{r}_{12}\cos 2\tilde{\beta}}.$$

5. The multicolor electrochromic structure according to claim 1, wherein the dielectric layer is mainly fabricated by an electrochromic material.

6. The multicolor electrochromic structure according to claim 5, wherein the electrochromic material comprises a transition metal oxide, such as $WO_3$, $NiO$, $TiO_2$, $Nb_2O_5$, $Fe_2O_3$, $Co_2O_3$ or $MoO_3$.

7. The multicolor electrochromic structure according to claim 1, wherein the dielectric layer and the electrolyte are in contact; and/or the thickness of the dielectric layer is in the range of 50-2000 nm.

8. The multicolor electrochromic structure according to claim 1, wherein the thickness of the metal reflective layer is in the range of 50-3000 nm; and/or the metal reflective layer is a current collector of the electrochromic layer.

9. The multicolor electrochromic structure according to claim 1, wherein the thin metal layer is further added to optimize the color of a multicolor film; and the thickness of the thin metal layer is in the range of 0.1-30 nm.

10. The multicolor electrochromic structure according to claim 5, wherein a semiconductor material can be further added to the dielectric layer to optimize the color of a multicolor film; the semiconductor material may be $Al_2O_3$, $SiO_2$, ZnS, $MgF_2$, $SiN_x$, etc.; the thickness of the semiconductor material is in the range of 0.1-100 nm.

11. The multicolor electrochromic structure according to claim 1, wherein the auxiliary electrode comprises a transparent conducting electrode with an ion storage layer, and the ion storage layer is in contact with the electrolyte.

12. The multicolor electrochromic structure according to claim 1, wherein the electrochromic layer is arranged on a substrate.

13. The multicolor electrochromic structure according to claim 12, wherein the material of the substrate comprises glass, organic glass, a plastic plate, a wood plate or metal.

14. The multicolor electrochromic structure according to claim 1, wherein the electrolyte comprises a liquid electrolyte, a gel electrolyte or a solid electrolyte.

15. The multicolor electrochromic structure according to claim 1, wherein the working voltage of the multicolor electrochromic structure is from −4 V to +4 V.

16. A fabrication method of the multicolor electrochromic structure according to claim 1, comprising:
    fabricating a metal reflective layer and a dielectric layer to form a working electrode; and
    assembling the working electrode, an electrolyte, an auxiliary electrode to form a multicolor electrochromic structure.

17. The fabrication method according to claim 16, comprising: fabricating the metal reflective layer and the dielectric layer in at least one manner of magnetron sputtering, electron beam evaporation, thermal evaporation and electrochemical deposition.

18. A regulation method of the multicolor electrochromic structure according to claim 1, comprising:
    connecting the working electrode and the auxiliary electrode with a power supply to form a working circuit;
    regulating the difference in potential between the working electrode and the auxiliary electrode such that the refractive index of an electrochromic material in the dielectric layer is changed so as to regulate the color of the multicolor electrochromic structure.

19. An electrochromic device comprising the multicolor electrochromic structure according to claim 1.

20. An image display comprising the multicolor electrochromic structure according to a claim 1 or comprising the multicolor electrochromic structure according to claim 14.

* * * * *